United States Patent Office 2,795,569
Patented June 11, 1957

2,795,569

ETHYLENIMINE METHYLOL-PHOSPHORUS POLYMERS AND PROCESS OF PREPARATION

Wilson A. Reeves and John D. Guthrie, New Orleans, La., assignors to the United States of America as represented by the Secretary of Agriculture No Drawing. Application November 18, 1953, Serial No. 393,023

6 Claims. (Cl. 260—45.2)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to unique phosphorus and nitrogen containing polymers. More particularly, the invention provides cross-linked flameproof polymers, the liquid members of which have an unusually high water solubility and the solid members of which have unusually high hydrophilic properties and a resilient sponge-like structure which swells upon contact with water.

This invention is a continuation in part of our co-pending applications, Serial Nos. 283,743 and 283,744, filed April 22, 1952, now U. S. Patents Nos. 2,668,096 and 2,759,903, respectively; Serial No. 348,137, filed April 10, 1953, now abandoned; and Serial Numbers 378,435 and 378,437, filed September 3, 1953.

Our co-pending applications relate to valuable new methylol-phosphorus polymers produced by reacting at least one compound of the group, tetrakis(hydroxymethyl) phosphonium chloride, tris(hydroxymethyl) phosphine oxide and phosphorus linked methylol group containing derivatives thereof, with nitrogen compounds containing at least two members of the group, hydrogen atoms and methylol radicals, attached to trivalent nitrogen atoms.

The compounds tetrakis(hydroxymethyl) phosphonium chloride and tris(hydroxymethyl) phosphine oxide are hereinafter referred to by their initials THPC and THPO, respectively, and the term "phosphorus compounds" is used exclusively to refer to at least one compound of the group THPC, THPO and phosphorus linked methylol group containing derivatives thereof. The phosphorus linked methylol group containing derivatives are the products of reacting THPC, THPO, or a mixture thereof, with at least one other compound to form a product containing at least two PCH$_2$OH groups in which the phosphorus atoms are members of pentavalent phosphorus radicals of the group, trimethylene phosphine oxide, (CH$_2$)$_3$PO, and tetramethylene phosphonium chloride, (CH$_2$)$_4$PCl.

In general, in accordance with this invention, ethylenimine methylol-phosphorus polymers are produced by reacting at least one phosphorus compound of the group tetrakis(hydroxymethyl) phosphonium chloride and tris-(hydroxymethyl) phosphine oxide and phosphorus linked methylol group containing derivatives thereof with an ethylenimine compound containing cyclic imino radicals of the formula

where R represents a radical of the group consisting of hydrogen, hydrocarbon radicals, and polyethylenimine residues.

The ethylenimine methylol-phosphorus polymers consist of cross-linked polymers containing reoccurring units of the structures, NCH$_2$P and NC(R)$_2$C(R)$_2$OCH$_2$P, in which R is a radical of the group consisting of hydrogen, hydrocarbon radicals, and polyethylenimine residues. As can be seen, the phosphorus atoms in these units are attached to trivalent nitrogen atoms by the structures —CH$_2$— and —C(R)$_2$C(R)$_2$OCH$_2$—. The phosphorus atoms themselves are members of pentavalent phosphorus radicals of the group consisting of trimethylene phosphine oxide and tetramethylene phosphonium chloride.

Illustrative examples of suitable ethylenimine compounds include ethylenimine, its homologs such as 2-methylethylenimine, its hydrocarbon analogs such as 2-phenylethylenimine, 2,3-diphenylethylenimine, 2-methyl-3,3-diphenylethylenimine, the polyethylenimines, the products of reaching formaldehyde with such ethylenimine compounds, and the like.

As the ethylenimine methylol-phosphorus polymers are forming, they pass through three more or less well defined stages. In these stages the polymers may be regarded as: (a) liquid, completely water soluble resinoids; (b) medium molecular weight semisolid resinoids which, when the ratio of the phosphorus compound or its derivatives is high, are substantially completely water soluble; and (c) resilient, spongy, solid resinoids which are insoluble in substantially all inert liquids.

The ethylenimine methylol-phosphorus polymers are useful as resilient solid polymers, as materials for use in the production of flameproof textiles, synthetic plastic articles, protective coatings, paints, varnishes, and the like. Their unique properties of high water swellability, pronounced hydrophilic character, and soft resilient physical structure, renders them particularly valuable for use as modifiers, copolymerizing monomers, and plasticizers for other resins, particularly methylol-phosphorus polymers.

In the production of the ethylenimine methylol phosphorus polymers, the phosphorus compounds, and the nitrogen compounds can be mixed in substantially any proportions.

Preferred ethylenimine methylol-phosphorus polymers are prepared by reacting the phosphorus compounds in an aqueous medium with mono or polyethylenimine in the presence or absence of formaldehyde. The ratio of moles of ethylenimine compound containing a NH group to moles of phosphorus compound is preferably from about 1 to 1 to 4 to 1. The reaction is preferably conducted at from 0 to 160 degrees C.

Preferred phosphorus compounds comprise mixtures of THPC and THPO predominating in THPC. Such mixtures can be formed by mixing THPC and THPO or by reacting THPC with a basic compound until a minor proportion is converted to THPO. Basic compounds such as amines, imines or water soluble salts of carbonic acid can suitably be used, and the conversion can suitably be conducted in situ in the presence of the ethylenimine compound.

Further polymerizable ethylenimine methylol phosphorus polymers can be insolubilized in bulk, in solution, or in situ as an impregnant, by the application of heat, and/or by reaction with ammonia. The ammonia insolubilization is described in greater detail in our co-pending application, Serial No. 393,021 filed of even date, now U. S. Patent No. 2,772,188.

Further polymerizable ethylenimine methylol-phosphorus polymers can be reacted with one or more compounds containing at least one group which yields a condensation product with a phosphorus linked methylol group. Illustrative examples of suitable compounds containing phosphorus linked methylol group-reactive groups include primary and secondary amines such as cetylamine, diethanolamine, hexamethylenepentamine, amides such as acrylamide, melamine, guanidine and urea, polypeptides such as proteins, water soluble methylol derivatives of such nitrogen compounds, such as the water soluble methylol melamines, phenolic compounds such as phenol, the polyhydroxy benzenes, and the like. Such reactions produce modified ethylenimine methylol phosphorus polymers in which the unique hydrophilic and resilient properties of the ethylenimine polymers modify or are modified by, the properties characteristic of other methylol phosphorus polymers.

The following examples are illustrative of details of the invention. The word "parts" is used exclusively to refer to parts by weight.

*Example 1*

A solution of 3.2 parts of ethylenimine in 10 parts of water was mixed with a solution of 5 parts of THPC in 5 parts of water. The ratio of moles of ethylenimine to moles of phosphorus compound was 3 to 1. An exothermic reaction occurred and within two minutes a clear gel formed.

The gel was soluble in water, volume for volume. A portion of the gel was heated to 150° C. for several minutes. The heating produced a hard brown solid polymer which was insoluble in water or alkali. After standing at room temperature (25° C.) for 20 minutes, the polymer became resilient. When four parts of the resilient polymer were mixed with 30 parts of water, the polymer swelled until it occupied the entire volume. The resilient polymer contained 6.2% phosphorus and 14.9% nitrogen on a dry basis.

*Example 2*

A solution of 1.1 parts of ethylenimine in 4.4 parts of water was mixed with a solution of 5 parts of THPC in 5 parts of water. The ratio of moles of ethylenimine to moles of phosphorus compound was 1 to 1. An exothermic reaction occurred and was controlled by cooling. Within a few minutes the exothermic reaction had stopped and the reaction mixture was a viscous solution.

One part of the solution was spread into a thin layer and heated for 10 minutes at 130 degrees C. The heating produced a hard water soluble polymer which upon standing at room temperature became resilient.

*Example 3*

A solution of 2.2 parts of ethylenimine and 7 parts of water was mixed with a cool solution (at about 5°) consisting of 5 parts of THPC in 5 parts of water. The ratio of moles of ethylenimine to moles of phosphorus compound was 2 to 1. Within about 3 minutes a gel formed. Heating the gel to about 150° C. for a few minutes converted it to a hard polymer which upon standing at room temperature became a resilient polymer.

When three parts of the dry resilient polymer was mixed with 40 parts of water, it swelled to take up the entire volume. The resilient polymer contained 5.7% phosphorus and 12.5% nitrogen on a dry basis.

*Example 4*

A piece of 80 by 80 cotton print cloth was impregnated with a solution of 5 parts of THPC in 15 parts of water and dried at 80° C. The dry cloth was then impregnated with a solution consisting of 4 parts of ethylenimine and 16 parts of water and dried at 75° C. for 25 minutes.

The treated fabric was flameproof (Federal Specification CCC-T-191b), and exhibited 100% of its original warp tear strength. The fabric contained 1.75% of phosphorus and, after boiling for 2½ hours in a 1% soap solution containing 0.2% sodium carbonate, retained 1.36% phosphorus, and would still pass the flame test.

*Example 5*

A solution of 1 part of THPO in 3 parts of water was mixed with ½ part of ethylenimine. An exothermic reaction occurred and within a few minutes a clear gel formed. When the gel was heated at 140° C. it became a hard brown solid polymer.

The freshly prepared dry polymer was brittle but upon standing in a moist atmosphere for a few minutes, it became resilient. The resilient polymer was substantially completely insoluble in water and swelled materially upon contact with water.

*Example 6*

A solution of 3.2 parts of a viscous liquid polyethylenimine in 10 parts of water was mixed with a solution of 5 parts of THPC in 5 parts of water. An exothermic reaction occurred, and in a few minutes, a clear gel was formed.

The gel was heated for a few minutes at about 150° C., until the gel became a solid polymer. Upon standing at room temperature the polymer soon became resilient.

*Example 7*

A viscous solution of a methylol group containing phosphorus compound derivative was produced by reacting THPC with ethylenimine as described in Example 2. One part of this solution was mixed with a solution of one part of a water soluble methylol melamine containing about 3 methylol groups per molecule in 4 parts of water. The combined solutions were heated for several minutes at about 100° C. until a gel was formed.

The gel was heated for several minutes at about 130° C., until a solid polymer was produced. The polymer was resilient, flexible, and insoluble in water and in aqueous solutions of alkali metal hydroxide.

We claim:

1. A cross-linked polymer containing recurring structural units composed of phosphorus atoms contained in radicals of the group consisting of trimethylene phosphine oxide and tetramethylene phosphonium chloride and which are attached to trivalent nitrogen atoms by connecting structures of the group consisting of —CH$_2$— and —C(R$_2$)C(R$_2$)OCH$_2$— in which R is a radical of the group consisting of hydrogen, methyl, and phenyl, said polymer having been produced by reacting, in an aqueous solvent at a temperature from about 0° to 160° C., at least one phosphorus compound selected from the group consisting of tetrakis(hydroxymethyl) phosphonium chloride, tris(hydroxymethyl) phosphine oxide, and phosphorus-linked methylol-group-containing derivatives thereof with an ethylenimine compound of the formula

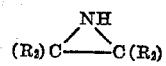

wherein R is a radical of the group consisting of hydrogen, methyl, and phenyl, the ratio of ethylenimine compound to phosphorus compound being from about 1:1 to about 4:1.

2. A process for producing a phosphorus-containing cross-linked polymer which comprises reacting, in an aqueous solvent at a temperature from about 0° to 160° C., at least one phosphorus compound selected from the group consisting of tetrakis (hydroxymethyl) phosphonium chloride, tris (hydroxymethyl) phosphine oxide, and phosphorus-linked methylol-group-containing derivatives thereof with an ethylenimine compound of the formula

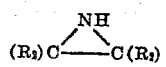

wherein R is a radical of the group consisting of hydrogen, methyl, and phenyl, the ratio of ethylenimine compound to phosphorus compound being from about 1:1 to about 4:1.

3. The process of claim 2 in which the phosphorus compound is tetrakis(hydroxymethyl)phosphonium chloride.

4. The process of claim 3 in which the ethylenimine compound is ethylenimine.

5. A process for producing a phosphorus-containing cross-linked polymer which comprises reacting, in an aqueous solvent at a temperature from about 0° to 160° C., at least one phosphorus compound selected from the group consisting of tetrakis(hydroxymethyl)phosphonium chloride, tris (hydroxymethyl) phosphine oxide, and phosphorus-linked methylol-group-containing derivatives thereof with an ethylenimine compound of the formula

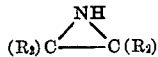

wherein R is a radical of the group consisting of hydrogen, methyl, and phenyl, the ratio of ethylenimine compound to phosphorus compound being from about 1:1 to about 4:1, and then further heating the phosphorus compound-ethylenimine compound reaction product in an aqueous solvent with a substance capable of reacting with a phosphorus-linked methylol group, said substance being selected from the group consisting of primary amines, secondary amines, amides, polypeptides, water soluble methylol derivatives thereof, and phenols.

6. The process of claim 5 wherein the phosphorus compound is tetrakis(hydroxymethyl) phosphonium chloride, the ethylenimine compound is ethylenimine, and the substance capable of reacting with a phosphorus-linked methylol group is a water-soluble methylol melamine.

No references cited.